3,153,649
PROCESS FOR PRODUCING 3-AMINO-6-SUBSTI-
TUTED AND 5,6-SUBSTITUTED 1,2,4-TRIAZINE
COMPOUNDS
Yutaka Kodama, Isamu Saikawa, Toyoo Maeda, and
Akira Takai, all of Toyama-shi, Japan, assignors to
Toyama Kagaku Kogyo Kabushiki Kaisha, Tokyo,
Japan, a corporation of Japan
No Drawing. Filed Nov. 15, 1961, Ser. No. 152,633
Claims priority, application Japan Feb. 13, 1961
4 Claims. (Cl. 260—240)

This invention relates to an improved process of producing 3-amino-1,2,4 triazines by heating bis-(5-nitrofurfurylidene) acetone guanyl hydrazone and an alternative process for producing 3-amino-6-(5'-nitrofurylethenyl)-1,2,4-triazine.

In the co-pending application of Kodama, Saikawa, Maeda, Takai and Takamichi, Serial Number 152,632, filed November 15, 1961, there is described a process for producing a 3-amino-6-(5'-nitrofurylethenyl)-1,2,4-triazine by heating a bis-(5-nitrofurfurylidene) acetone guanyl hydrazone in an organic medium at a pH of more than 4.0 in the presence of a base, and there is also described and claimed in the said application a process of producing 3-amino-5-(5'-nitrofurfuryl)-6-(5'-nitrofurfurylethenyl) - 1,2,4 triazines by heating the same acetone guanyl hydrazone compound in organic medium at a pH of more than 4.0 but in the absence of an added base. This latter process produces a very low yield of the desired 3-amino-triazine compounds. The present invention produces the same compounds by heating a salt of the acetone guanyl hydrazone in the presence of an acid salt of an alkali metal or alkaline earth metal or a mixture transformable thereto so that the pH is maintained between 3.0 and 4.5. The acetone guanyl hydrazone may be present as such as its addition salt or as a mixture of the addition salt and the free base.

The present invention also includes a method of transforming the product of the above reaction into a 3-amino-(5'-nitrofurylethenyl)-1,2,4-triazine salt or base.

The organic solvents used to form the reaction medium are essentially the same as in the co-pending application referred to above. They include glycols such as ethylene and propylene glycol, tetrahydrofuryl alcohol, diozane, dimethylformamide, dimethyl acetamide, dimethylsulfoxide, butanol, amyl alcohol, etc.

The salts include dihydrogen phosphates, hydrogen phosphates, bicarbonates, bisulfites, acetates and the like of alkali metals and alkaline earth metals or ammonium salts which have an acid reaction. The purpose of the addition of the acid salt and its amount is to produce a pH which preferably is in the range of 3.0 to 4.5. Under the conditions of the present invention greatly improved results are obtained, with yields up to 70 to 90 percent instead of yields of around 20 and 30 percent as were hitherto obtained.

When the base from the above controlled reaction of bis-(5-nitrofurfurylidene) acetone guanyl hydrazone is recrystallized from methanol or acetone it is divided into two compounds, one fairly soluble in the solvent, and the other having a low solubility. Their colors are different, the latter being a dark red instead of reddish orange. These two compounds have the same chemical constitution but apparently have a different crystal structure or steric arrangements. They will be referred to as the alpha type which is poorly soluble and the beta type which is fairly soluble. Once separated the bases form salts with ordinary acids in aqueous solutions such as hydrochlorides, sulfates and the like, but with different decomposition temperatures. This is shown in the following table:

|  | Poorly soluble base α-type | Fairly soluble base β-type |
| --- | --- | --- |
| Base | Decomp. at 182° C. | Decomp. at 100-115° C. |
| Hydrochloride | Decomp. at 244–246° C. | Decomp. at 236° C. |
| Sulfate | Decomp. at 239° C. | Decomp. at 91° C. |
| Hydrochloride in water | Poorly soluble | Fairly soluble. |

Both the alpha and beta types have the same elemental analysis and the same UV and infrared absorption spectra. The UV maxima occur at 240, 300 and 385 mu. There does not appear to be a great difference in the antibacterial activity of the two types. Also, as will be brought out below, when the two forms of the product of the first reaction are subjected to conditions which remove the 5-nitrofurfuryl group they behave in the same manner and produce the same final compound.

The second aspect of the present invention involves the splitting off of the nitrofurfuryl group and this is effected by dissolving or suspending the bases, either alpha or beta type, or both, in a solvent such as a glycol, dimethylformamide, dimethyl acetamide, butanol, amyl alcohol, etc. This is then heated at a temperature above 100° C. with a basic substance such as a carbonate, bicarbonate, phosphate, hydroxide or acetate of an alkali metal or alkaline earth metal, or an organic base such as pyridine, piperidine, hydrazine or ammonia. Where the base is liquid such as pyridine, additional solvent may be omitted. Reaction between the solid base and the triazine compound also proceeds but less smoothly than when the reaction medium is liquid or at least readily stirrable. The amount of base to be used depends on whether a base or salt of the nitrofurfuryl compound is used, but it must in all cases be in excess of that which would transform salt into the free base. This portion of the invention will be described in greater detail in the following specific examples.

The invention will now be described in greater detail in conjunction with the following specific examples in which the proportions are by weight unless otherwise specified.

*Example 1*

0.05 mole of bis-(5-nitrofurfurylidene)acetone guanyl hydrazone hydrochloride, 0.0195 mole of disodium hydrogen phosphate ($Na_2HPO_4 \cdot 12H_2O$) in 200 parts of dimethylformamide are heated at 125–127° C. until the reaction is completed, at which time the reaction mixture is clear and dark red in color. It has a pH of approximately 3.5. The reaction mixture is then diluted with 600 parts of water, acidified with hydrochloric acid and filtered while hot. The filtrate is then rendered alkaline with aqueous ammonia and first changes to an orange color which later becomes dark red. After recrystallization from methanol the separated base is dark red in color and it is poorly soluble in cold methanol. The base is converted with dilute hydrochloric acid into the hydrochloride which is recrystallized from water. The hydrochloride decomposes at 246° C. and is of the alpha type. analyses correspond to 3-amino-5-(5'nitrofurfuryl)-6-(5'-nitrofurylethenyl)-4,5-dihydro-1,2,4-triazine.

The mother liquor from the recrystallization in methanol is concentrated and then diluted with water. An orange colored base separates out and is recovered by filtration. This base turns black at about 100° C. with decomposition. When the base is converted into its hydrochloride by dilute hydrochloric acid it is recrystallized from water and the resulting product decomposes at 236° C. and is the beta type. Elemental analyses correspond to 3-amino-5-(5'-nitrofurfuryl)-6-(5'-nitrofurylethenyl)-4,5-dihydro-1,2,4-triazine.

Example 2

A mixture of 0.025 mole of bis-(5-nitrofurfurylidene)-acetone guanyl hydrazone hydrochloride, 0.025 mole of sodium dihydrogen phosphate ($NaH_2PO_4 \cdot H_2O$) and 100 parts of dimethylformamide is heated with stirring at 130–135° C. The mixture is then diluted with 300 parts of water containing some hydrochloric acid and filtered while hot. After cooling the mixture, yellow crystalline alpha type hydrochloride is separated out. The mother liquor is rendered alkaline with aqueous ammonia and the separated crystalline mass is recovered by filtration, treated again with dilute hydrochloric acid to yield more crystalline α type hydrochloride. The total yield of both types is about 85 percent of theoretical.

Example 3

0.025 mole of bis-(5-nitrofurfurylidene)acetone guanyl hydrazone hydrochloride and an equal molar amount of disodium hydrogen phosphate in 100 parts of dimethylformamide is heated with stirring at 120° C. until the reaction is complete. The reaction mixture is allowed to cool, yellow crystalline alpha type hydrochloride separating out. After filtration the mother liquor is rendered alkaline with ammonia and a base is precipitated. The separated base is again treated with dilute hydrochloric acid and the resulting hydrochloride recrystallized from water to produce pure alpha type hydrochloride. The base separated from the alkaline mother liquor is of the beta type and the total yield is between 60 and 70 percent.

Example 4

The procedure of Example 3 is repeated, but after reaction the reaction mixture is diluted with 250 parts of water containing some hydrochloric acid. It is filtered hot and the filtrate rendered alkaline with ammonia. The base which precipitates out is collected by filtration. The base obtained is dried under reduced pressure at temperatures below 50° C. and is a dark red product with a yield of over 90 percent. After recrystallization from methanol a dark red alpha type base is obtained which decomposes at 181° C. From the filtrate the methanol is removed by distillation under reduced pressure and water is then added. Reddish orange beta type base is obtained which decomposes at 100° C.

Example 5

1 part of alpha type 3-amino-5-(5'-nitrofurfuryl)-6-(5'-nitrofurylethenyl)-1,2,4-triazine hydrochloride is dissolved in 20 parts of dimethylformamide and 3 parts of a 50 percent aqueous sodium hydroxide solution is added in portions. When all of the alkali has been added the mixture is heated at 130–140° C. until the reaction is complete and forms a yellowish orange colored solution.

The solution is subjected to concentration under a vacuum to recover dimethylformamide, then a small amount of water is added and the mixture acidified with hydrochloric acid and filtered. The filtrate is decolorized with activated carbon and then concentrated under reduced pressure. The hydrochloride precipitate of the 3-amino-6-(5'-nitrofurylethenyl)-1,2,4-triazine decomposes at 239° C. and on treatment with ammonia the corresponding hydrated free base can be obtained which decomposes at about 270° C.

Example 6

2 parts of a mixture of alpha and beta hydrochlorides produced in accordance with Examples 1 to 4 are dissolved in 100 parts of n-butanol, and the resulting solution is refluxed while gaseous ammonia is introduced. The amount of ammonia is in excess of that which is required to transform the hydrochloride into a free base. A black colored substance gradually appears in the reaction mixture which then turns yellow. After reaction is completed the undissolved material is removed by filtration, the filtrate is treated with water and acidified with hydrochloric acid. After a second filtration a pale yellow filtrate is obtained which is rendered alkaline with sodium carbonate. The yellow-orange colored 3-amino-6-(5'-nitrofurylethenyl)-1,2,4-triazine precipitates and is separated by filtration.

Example 7

5 parts of the beta hydrochloride produced according to Examples 1 to 4 is mixed with 1.1 parts of sodium carbonate and 50 parts of dimethylformamide. The mixture is then heated at 120–125° C. with agitation. After reaction is complete the mixture is acidified with hydrochloric acid and diluted with 100 parts of water. Undissolved material is removed by filtration, leaving a reddish orange colored filtrate which is then rendered alkaline with ammonia. The yellow-orange free base separates out and is recovered by filtration and dried. It decomposes at 268° C. and can be transformed into the hydrochloride which decomposes at 239° C.

Example 8

3 parts of the beta base produced according to Examples 1 to 4 and an equal amount of pyridine are heated together at 120 to 130° C. A black powder results which is transformed into an aqueous yellow solution by the addition of dilute hydrochloric acid. The undissolved black mass is removed by filtration and the filtrate rendered alkaline with ammonia. Thereupon a yellow orange colored free base is obtained which can be transformed into the hydrochloride with dilute hydrochloric acid. The hydrochloride is recovered in yellow crystalline needles, decomposing at 235° C.

We claim:

1. A process of producing a 3-amino-5-(5'-nitrofurfuryl)-6-(5'-nitrofurylethenyl)-1,2,4-triazine, which comprises heating bis-(5-nitrofurfurylidene)-acetone guanyl hydrazone with an acid salt at a pH between 3.0 and 4.5 at a temperature below the decomposition product of the triazine and not below 100° C.

2. A process according to Claim 1 in which the heating is effected in an inert organic solvent.

3. A process of producing a 3-amino-6-(5'-nitrofurylethenyl)-1,2,3-triazine which comprises heating a compound selected from the group consisting of 3-amino-5-(5'-nitrofurfuryl) - 6-(5'-nitrofurylethenyl)-1,2,4-triazine and its addition salts with a basic substance at a temperature below the decomposition product of the triazine and not below 100° C.

4. A process according to claim 3 in which the heating is in the presence of an inert solvent.

References Cited in the file of this patent

Miura et al.: Journal of the Pharm. Soc. of Japan, vol. 81, No. 9 (1961), pp. 1357–60 and 1372–1374, RS1P45.